Nov. 17, 1959  R. KATES  2,913,586
PHOTO-ELECTRIC SINE WAVE GENERATOR AND SYSTEM
Filed March 29, 1957

INVENTOR.
ROLF KATES

United States Patent Office 2,913,586
Patented Nov. 17, 1959

2,913,586

PHOTO-ELECTRIC SINE WAVE GENERATOR AND SYSTEM

Rolf Kates, Brookline, Mass., assignor to the United States of America as represented by the Secretary of the Air Force Application March 29, 1957, Serial No. 649,571

3 Claims. (Cl. 250—225)

(Granted under Title 35, U.S. Code (1952), sec. 266)

The invention described herein may be manufactured and used by or for the United States Government for governmental purposes without payment to me of any royalty thereon.

The present invention relates to a photo-electric cell sine wave generator, and methods and systems utilizing such a sine wave generator, wherein a sinusoidal output signal is generated in synchronism with the movement of a rotating shaft.

The prior art suggests a number of methods for generating a sine or cosine wave function in response to the relative displacement of a shaft with respect to a fixed position. One such method involves the use of a sine potentiometer which produces an undesirable step-by-step output due to brush contact from wire to wire. Other sine wave generators include condensor and resolver types of instruments, which also generate step-by-step output signals, wherein said signals must be subsequently demodulated. It is noted in the condensor and resolver type instruments, the difference between steps will be directly dependent upon the frequency of the carrier wave.

As more specifically stated, the present invention comprises a photo-electric cell sine wave generator for producing a sinusoidal output in synchronism with the movement of a rotating shaft. The generator includes a light source, a photo-electric cell, and a pair of light-polarizing filters interposed between the light source and the photo-electric cell, with one of the filters being rotatably driven by a shaft at a ratio of 2:1. Because of this 2:1 ratio, and its effect upon the polarizing action, the sinusoidal output from the photo-electric cell is in harmonic synchronism with the angular progression of the rotating element constituting the reference motion.

The subject invention may be incorporated, for example, in the CARTRAC System for tracking radar targets while scanning, and thereby aid in the control of an aircraft in flight.

One feature of the present invention is a sine wave generator which will generate a wave of smoothly varying function without breaks between the increment of said wave.

Another feature of the present invention is the greater accuracy obtainable by use of subject invention in comparison with sine wave generator of the prior art.

Still another feature of the present invention is the elimination of all mechanical connections between the electrical components of said invention.

Figure 1:
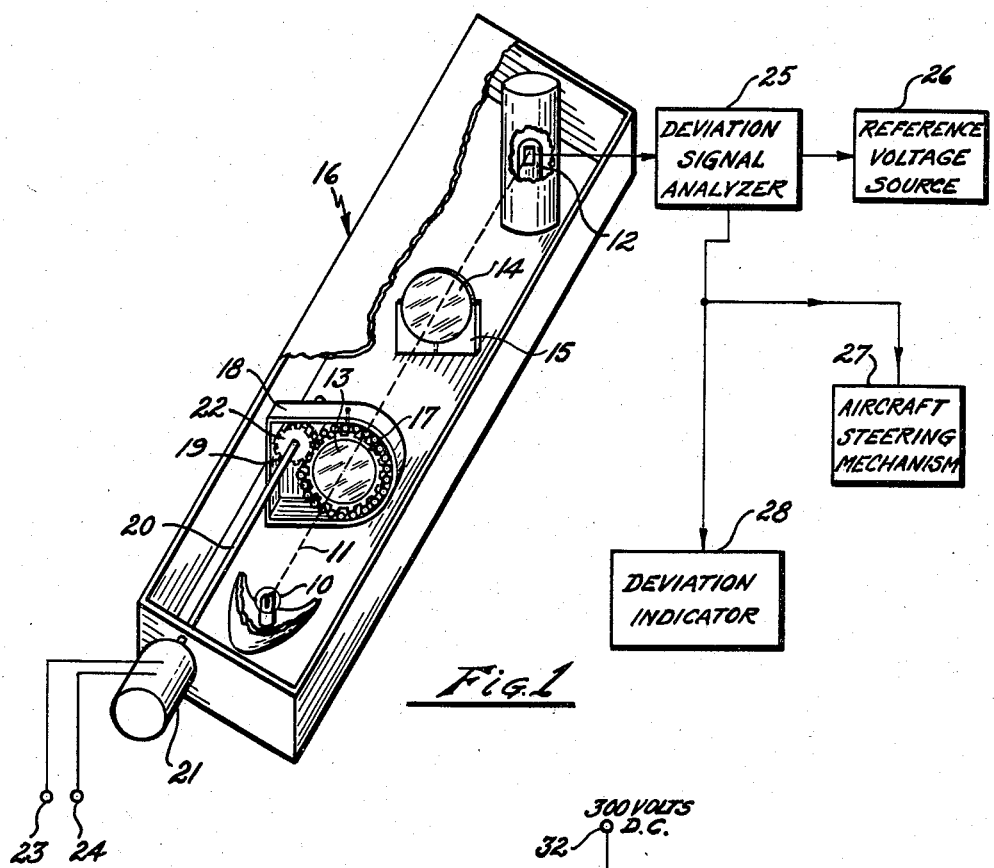
Figure 2:
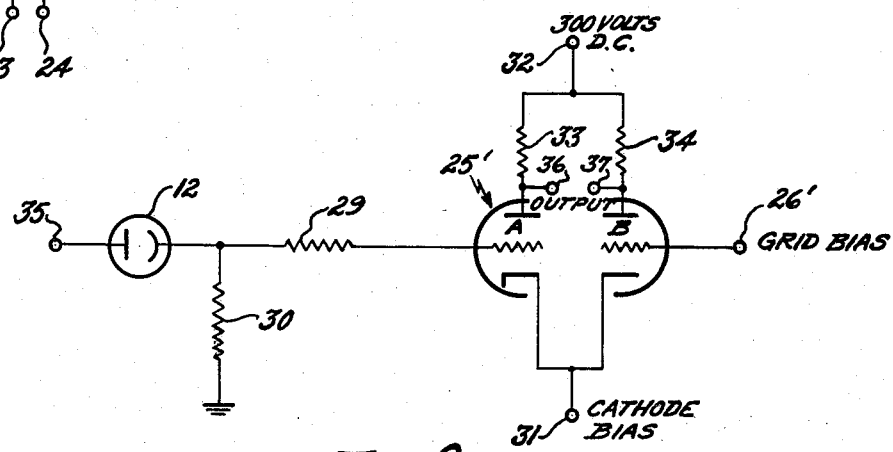

Other features, objects and advantages will become apparent when taken in connection with the drawings of which:

Fig. 1 is a schematic block diagram of the components which comprise the photo-electric sine wave generator system of my present invention; and Fig. 2 is an electrical schematic circuit diagram of the photo-electric cell and difference amplifier of the present invention.

As seen in Fig. 1, the operation of subject invention is as follows:

A light source 10 emits a light beam 11 in the direction of a photo-electric cell 12. The intensity of the light which impinges upon the photo-electric cell 12, is controlled by the relative position between light polarizer 13 and polarity analyzer 14. Polarity analyzer 14 is held in a fixed position by a support 15, which in turn, is secured to the base of a light-tight container 16. Polarizer 13 is rotatably mounted on roller bearing 17 within support 18. Support 18 also is secured to base of container 16. Polarizer 13 is secured within an annular frame 19 having external peripheral teeth. A shaft 20, which is driven by servomotor 21, is provided with a gear 22 at its free end. The teeth of gear 22 are positioned so as to mesh with the teeth of annular frame 19, whereby rotation of servomotor 21 will cause rotation of light polarizer 13. Since the overall diameter of polarizer 13 and annular frame 19 are twice the diameter of gear 22, shaft 20 will have to make two complete revolutions for one revolution of polarizer 13.

Since shaft 20 is driven at a ratio of 2:1 with respect to the rotation of the polarizer 13, if the shaft turns through an angle $\theta$, the polarizer will obviously simultaneously turn through an angle $\theta/2$. By Malus' law the intensity of light passing through two polarizing filters, such as polarizer 13 and analyzer 14, is represented by the equation, $$I = I\max \cos^2 \alpha \qquad (1)$$

wherein "$\alpha$" is the angle between the planes of polarization of the two filters, "$I\max$" is the maximum intensity of light capable of passing through said filters from a given light source and "$I$" equals the intensity of light at any angle of "$\alpha$." As above defined, $\alpha$ will equal $\theta/2$.

Since by the trigometric equality, $$\cos^2 \alpha = \frac{1 + \cos 2\alpha}{2} \qquad (2)$$

by substituting Equation 2 into Equation 1, the following relationship is obtained $$I = I\max (\tfrac{1}{2} + \tfrac{1}{2} \cos 2\alpha) \qquad (3)$$

It can be seen from Equation 3 that if the shaft 20 only should rotate through the same angle, as polarizer 13, that is at a 1:1 ratio, the number of cycles of the deviation input signals applied to terminals 23 and 24, which is converted into an equal number of shaft revolutions will cause the resultant angle between the planes of polarization of the two filters to be half the angle necessary to reproduce the number of cycles of said deviation input signals. In other words, polarizer 13 must pass through an angle of $\alpha$ for every movement of shaft 20 through angle $2\alpha$ to reproduce the exact number of cycles of the input signals.

Under the assumed 2:1 drive ratio, as above noted, $$2\alpha = \theta \qquad (4)$$

By substituting Equation 4 in Equation 3, the intensity of light incident on the face of the photo-electric 12 in the present application is, $$I = \frac{I \max}{2} + \frac{I \max}{2} \cos \theta \qquad (5)$$

which is a precise and undistorted sinusoidal wave in synchronism with the shaft position. The output voltage of photo-electric cell 12 is, therefore, directly proportional to the input light intensity.

As seen in Fig. 1, one possible application of the photo-electric cell sine wave generator may be in the control of the flight path of an aircraft. If the aircraft is on the desired flight path no signal will be applied to the servomotor 21 through terminals 23 and 24. Once, however, the aircraft deviates from the desired flight path a deviation signal is applied to turn the shaft 20 in accordance with the degree of rotation of the rotor of servomotor 21. Due to the 2:1 ratio of rotation between the shaft 21 and polarizer 13, light beam 11 impinging on photo-electric cell 12, will cause said photo-electric cell to generate a voltage directly proportional to the intensity of the light from light source 10, which in turn, is directly proportional to the deviation input signal. The output voltage from photo-electric cell 12 is then applied to a deviation analyzer 25 which compares said voltage with a standard reference voltage 26. Thus, the output from the deviation analyzer 25 will be the difference between the output voltage of said photo-electric cell 12 and said standard reference voltage. This difference voltage may then be applied to either a deviation indicator 28 or an aircraft steering mechanism 27. The voltage to said aircraft steering mechanism 27, may be utilized, for example, to correct the rudder position of an aircraft and alter the flight path in accordance with a given deviation.

Fig. 2 shows the deviation signal analyzer 25, in the form of a difference amplifier 25', which may receive an input voltage from photo-electric cell 12. Said difference amplifier eliminates the D.C. component from the voltage generated by said photo-electric cell. The plate of photo-electric cell 12 is tied to a 200 D.C. voltage source 35. Resistors 29 and 30 are provided to couple the voltage output from photo-electric cell 12 to the grid of triode A of difference amplifier 25'. A reference grid bias voltage 26' is applied to the grid of triode B of amplifier 25'. The cathode of triodes A and B are tied to a common cathode bias 31 and the plates of said triodes are commonly connected to +300 volts D.C. source 32 through equal plate resistors 33 and 34. It can readily be seen that the output voltage across the plates of triodes A and B at terminals 36 and 37, will provide a voltage indicative of the difference between the voltage applied to the grid of triode A and the voltage applied to the grid of triode B.

In the present embodiment, as shown in Fig. 2, the following components have been used: photo-electric cell 12, a 929-type tube, difference amplifier tube 25', a 12AU7-type tube, resistor 29, 0.1 megohm, resistor 30, 25 megohms, and each of resistors 33 and 34, 24,000 ohms. It is to be understood, however, that the values of such components may be changed to suit the needs of a particular application.

The principal factor governing the practicability of the present invention resides in the use of light-polarizing filters for the modulation of a light source, in accordance with a 2:1 ratio between a measurable servomotor movement and the relative movement between two light polarizing filters. Such an arrangement eliminates any mechanical connection to electrical equipment and also introduces a high degree of accuracy, in both continuous and stationary shaft operations of said servomotor. Furthermore, it makes possible an output determined solely by shaft displacement and eliminates discontinuities in said output.

It is noted, that the particular mechanical arrangement for obtaining a 2:1 ratio between the shaft and polarizer, does not form part of the present invention and is merely shown for illustrative purposes. Obviously, many other arrangements may be used to achieve the same result.

I claim:

1. A servo system comprising a photo-electric cell, a light source, impinging light waves upon said cell, a pair of light-polarizing filters interposed between said cell and said light source for modulating said light waves, a source of standard reference voltage, means for fixedly mounting one of said filters with respect to the other, means for rotatably mounting the other of said filters, drive means for rotating said rotatable filter through a complete cycle of revolution, said driving means including a servo-motor, for causing rotation of said drive means at a 2:1 ratio with respect to said rotatable filter, means for analyzing the difference between the voltage generated by said photo-electric cell and said standard reference voltage, and means for utilizing said difference in said voltages to energize said servo-motor.

2. The system as defined in claim 1, wherein said means for analyzing the difference between the voltage generated by said photo-electric cell and said standard reference voltage includes a double triode difference amplifier with the difference output voltage being obtainable across the plates of said triodes.

3. An aircraft flight path control system comprising a photo-electric cell, a light source of fixed predetermined intensity transmitting light waves to said cell, a light analyzer interposed between said light source and said cell and in fixed relation to the aircraft, a rotatable light polarizer interposed between said light source and said cell, and means for driving said rotatable light polarizer and transmission means for causing said drive means to rotate twice as fast as said rotatable light polarizer.

References Cited in the file of this patent
UNITED STATES PATENTS

| | | |
|---|---|---|
| 2,167,484 | Berry | July 25, 1939 |
| 2,244,362 | Hartig | June 3, 1941 |
| 2,425,541 | Konet | Aug. 4, 1947 |
| 2,651,771 | Palmer | Sept. 8, 1953 |